US006258295B1

(12) United States Patent
Wehlage et al.

(10) Patent No.: US 6,258,295 B1
(45) Date of Patent: Jul. 10, 2001

(54) USE OF OXIME ESTERS AS ACTIVATORS FOR INORGANIC PEROXY COMPOUNDS

(75) Inventors: Thomas Wehlage, Speyer; Dieter Boeckh; Elisabeth Kappes, both of Limburgerhof; Alfred Oftring, Dürkheim; Birgit Potthoff-Karl, Ludwigshafen; Werner Bertleff, Viernheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/068,026

(22) PCT Filed: Oct. 28, 1996

(86) PCT No.: PCT/EP96/04678

§ 371 Date: May 4, 1998

§ 102(e) Date: May 4, 1998

(87) PCT Pub. No.: WO97/17420

PCT Pub. Date: May 15, 1997

(30) Foreign Application Priority Data

Nov. 3, 1995 (DE) ............................................. 195 41 012

(51) Int. Cl.[7] ............................ C01B 15/00; C01B 15/01
(52) U.S. Cl. .................................... 252/186.29; 252/186.4
(58) Field of Search ............................. 252/186.29, 186.4

(56) References Cited

U.S. PATENT DOCUMENTS 3,660,580 5/1972 Baker .
5,972,237 * 10/1999 Muller et al. .................... 252/186.39

FOREIGN PATENT DOCUMENTS 0 028 432 5/1981 (EP) .
0 267 046 11/1988 (EP) .
4-007400 10/1992 (JP) .
5-179295 7/1993 (JP) .
6-336468 6/1994 (JP) .
WO 93/04037 4/1993 (WO) .

OTHER PUBLICATIONS

Z. Chem., 7. Jg, (1967), Heft 9, pp. 344–345.

* cited by examiner

*Primary Examiner*—Kevin E. Weddington
(74) *Attorney, Agent, or Firm*—Oblon, Spivak, McClelland, Maier & Neustadt, P.C.

(57) ABSTRACT

Use of mono- and bisoxime esters I (I)

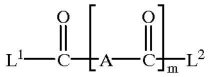

where $L^1$ is an oxime moiety of the formula

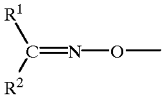

or

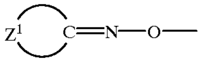

where $R^1$ and $R^2$ are hydrogen or organic radicals and $Z^1$ are alkylene groups, $L^2$ is a second oxime moiety $L^1$ or an organic radical attached via an O or N atom, A is a chemical bond or a linker, and m is 0 or 1, as activators for inorganic peroxy compounds, in particular as cold bleach activators or optical brighteners in detergents, cleaners and bleaches and in disinfectants.

6 Claims, No Drawings

USE OF OXIME ESTERS AS ACTIVATORS FOR INORGANIC PEROXY COMPOUNDS

The present invention relates to the use of certain mono- and bisoxime esters as activators for inorganic peroxy compounds, in particular as cold bleach activators or optical brighteners in detergents, cleaners and bleaches, and in disinfectants. The present invention furthermore relates to certain industrial formulations which contain these oxime esters.

In efforts concerned with energy-saving washing, cleaning and bleaching processes, recently temperatures in the lower temperature range, for example for textile laundering distinctly below 60° C., in particular below 45° C., have become increasingly important. However, at such temperatures, the effect of the known activators for inorganic peroxy compounds, this system being responsible for the bleaching or cleaning action, showed a distinct decline. This is why there has been no lack of attempts to develop activators which are more effective for this temperature range, but no convincing success has emerged to date.

EP-A 028 432 (1) discloses textile detergent formulations which contain, inter alia, acylated oximes such as acetyloximes, propionyloximes, lauroyloximes, myristoyloximes or benzoyloximes, or corresponding derivatives of dioximes, eg. diacetyldimethylglyoxime or phthaloyldimethylglyoxime.

EP-A 267 046 (2) describes bleach formulations which contain, inter alia, oxime esters, eg. octanoyloxydimethyloxime esters.

It is an object of the present invention to improve the bleaching, oxidizing and cleaning action of a system of activator and inorganic peroxy compounds in the lower temperature range, in particular from 15 to 60° C.

We have found that this object is achieved by using oxime esters of the general formula I (I)

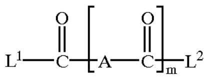

where $L^1$ is an oxime moiety of the formula

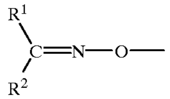

or

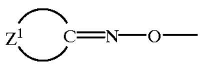

where $R^1$ and $R^2$ are hydrogen, $C_1$–$C_{30}$-alkyl, $C_2$–$C_{30}$-alkenyl, $C_5$–$C_8$-cycloalkyl, $C_7$–$C_{18}$-aralkyl or $C_6$–$C_{18}$-aryl or -hetaryl, where aliphatic radicals can additionally be functionalized by one to five hydroxyl groups, $C_1$–$C_4$-alkoxy groups, amino groups, $C_1$–$C_4$-alkylamino groups, di-$C_1$–$C_4$-alkylamino groups, chlorine atoms, bromine atoms, nitro groups, cyano groups, carboxyl groups, sulfo groups, carboxy-$C_1$–$C_4$-alkyl groups, carbamoyl groups or phenyl, tolyl or benzyl radicals, where aromatic, cycloaliphatic and heteroaromatic structural units can likewise be substituted by said radicals, or be interrupted by one to eight non-adjacent oxygen atoms, amino groups, $C_1$–$C_4$-alkylamino groups or carbonyl groups, and $z^1$ is 1,3-, 1,4-, 1,5-, 1,6-, 1,7- or 1,8-alkylene groups with 3 to 30 carbon atoms, which can additionally be functionalized by one to five hydroxyl groups, $C_1$–$C_4$-alkylamino groups, di-$C_1$–$C_4$-alkylamino groups, chlorine atoms, bromine atoms, nitro groups, cyano groups, carboxyl groups, sulfo groups, carboxy-$C_1$–$C_4$-alkyl groups, carbamoyl groups or phenyl, tolyl or benzyl radicals, where aromatic nulcei can in turn likewise be substituted by said radicals, or be interrupted by one or two non-adjacent oxygen atoms, amino groups, $C_1$–$C_4$-alkylamino groups or carbonyl groups, $L^2$ is a second oxime moiety $L^1$ or (a) an acyloxy radical of the formula

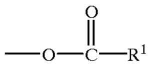

(b) a carboxamido radical of the formula

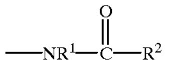

(c) a phenoxy radical of the formula

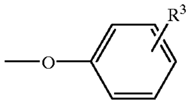

(d) a vinyloxy radical of the formula $—O—CR^1═CHR^2$ (e) a sulfonamido radical of the formula

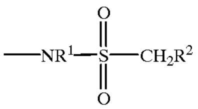

(f) a n imidazolyl radical of the formula

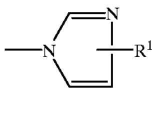

(g) a hydantoin residue of the formula

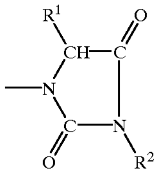

(h) a cyclic carbamate residue of the formula

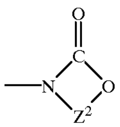

(j) a hydroxylactone residue of the formula

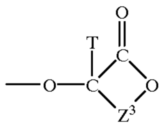

or (k) a lactam residue of the formula

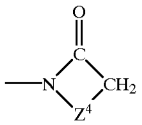

where $R^1$ and $R^2$ have the abovementioned meanings, $R^3$ is hydrogen, a carboxyl group, a sulfo group, a phosphono group or the alkali metal or ammonium salt thereof, T is hydrogen or $C_1$–$C_4$-alkyl, and $Z^2$ to $Z^4$ are 1,2-, 1,3-, 1,4- or 1,5-alkylene groups with 2 to 20 carbon atoms, which can additionally be functionalized by one to three hydroxyl groups, $C_1$–$C_4$-alkoxy groups, amino groups, $C_1$–$C_4$-alkylamino groups, di-$C_1$–$C_4$-alkylamino groups, chlorine atoms, bromine atoms, nitro groups, cyano groups, carboxyl groups, sulfo groups, carboxy-$C_1$–$C_4$-alkyl groups, carbamoyl groups or phenyl, tolyl or benzyl radicals, where aromatic nuclei can in turn likewise be substituted by said radicals, or be interrupted by one or two non-adjacent oxygen atoms, amino groups, $C_1$–$C_4$-alkylamino groups or carbonyl groups, A is a chemical bond or a $C_1$–$C_{18}$-alkylene group, a $C_2$–$C_{18}$-alkenylene group, a $C_5$–$C_{32}$-cycloalkylene group, a $C_7$–$C_{30}$-aralkylene group or a $C_6$–$C_{18}$-arylene group or -hetarylene group, where aliphatic structural units can additionally be functionalized by one to five hydroxyl groups, $C_1$–$C_4$-alkoxy groups, amino groups, $C_1$–$C_4$-alkylamino groups, di-$C_1$–$C_4$-alkylamino groups, chlorine atoms, bromine atoms, nitro groups, cyano groups, carboxyl groups, sulfo groups, carboxy-$C_1$–$C_4$-alkyl groups, carbamoyl groups or phenyl, tolyl or benzyl radicals, where aromatic, cycloaliphatic and heteroaromatic structural units can likewise be substituted by said radicals, or be interrupted by one to eight non-adjacent oxygen atoms, amino groups, $C_1$–$C_4$-alkylamino groups or carbonyl groups, and m is 0 or 1, as activators for inorganic peroxy compounds.

Suitable meanings for the $R^1$ and $R^2$ radicals, which can be identical or different, are, besides hydrogen, the following:

examples of suitable linear or branched $C_1$–$C_{30}$-alkyl groups are methyl, ethyl, n-propyl, isopropyl, n-butyl, isobutyl, sec-butyl, tert-butyl, n-pentyl, isopentyl, sec-pentyl, tert-pentyl, neopentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl or n-eicosyl; $C_1$–$C_{12}$-alkyl groups are preferred, especially $C_1$–$C_4$-alkyl groups;

examples of suitable linear or branched $C_2$–$C_{30}$-alkenyl groups are vinyl, allyl, 2-methyl-2-propenyl or the appropriate radicals derived from oleic acid, linoleic acid or linolenic acid; $C_2$–$C_6$-alkenyl and $C_{16}$–$C_{22}$-alkenyl groups are preferred;

particularly suitable $C_5$–$C_1$-cycloalkyl groups are $C_5$–$C_{10}$-cycloalkyl groups, eg. cyclopentyl, cyclohexyl, 2-, 3- or 4-methylcyclohexyl, 2,3-, 2,4-, 2,5- or 2,6-dimethylcyclohexyl, cycloheptyl or cyclooctyl;

particularly suitable $C_7$–$C_{18}$-aralkyl, especially $C_7$–$C_{12}$-aralkyl, groups are alkyl-substituted phenylalkyl groups, eg. benzyl, 2-, 3- or 4-methylbenzyl, 2-phenylethyl, 3-phenylpropyl, 4-phenylbutyl, 2-, 3- or 4-ethylbenzyl, 3- or 4-isopropylbenzyl or 3- or 4-butylbenzyl;

examples of suitable $C_6$–$C_{18}$-aryl groups are phenyl, 2-, 3- or 4-biphenylyl, α- or β-naphthyl, 2-, 3- or 4-methylphenyl, 2-, 3- or 4-ethylphenyl, 3- or 4-isopropylphenyl, 3- or 4-butylphenyl or 3- or 4-(2-ethylhexyl)phenyl; $C_6$–$C_{14}$-aryl groups are preferred, especially phenyl and alkyl-substituted phenyl;

particularly suitable $C_6$–$C_{18}$-hetaryl groups are five- or six-membered $C_6$–$C_{12}$-hetaryl groups with one or two heteroatoms from the group of nitrogen, oxygen and sulfur, and examples thereof are:

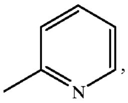,
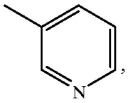,
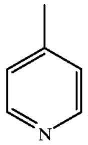,
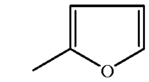,
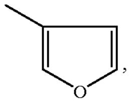,
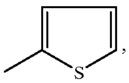,
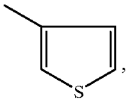,
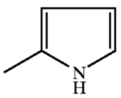,
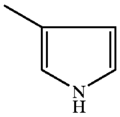,
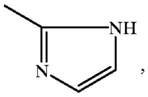,
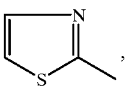,
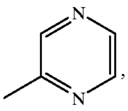,
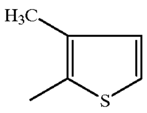 and
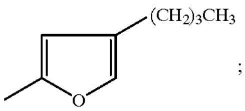;

examples of suitable aliphatic radicals interrupted by oxygen or amino groups, especially NH or $N(CH_3)$ groups are the following structures:

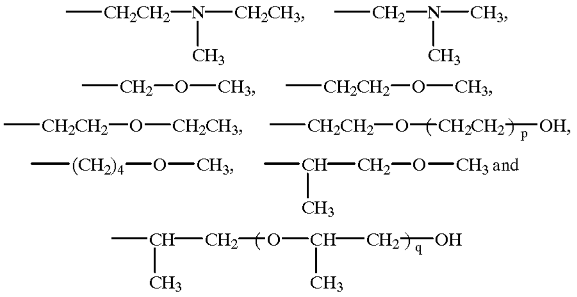

with p=2 to 8 and q=2 to 5.

The variable $Z^1$ in the cyclic oxime moieties $L^1$ can be, in particular, $C_3$–$C_{12}$-alkylene groups of the following structure:

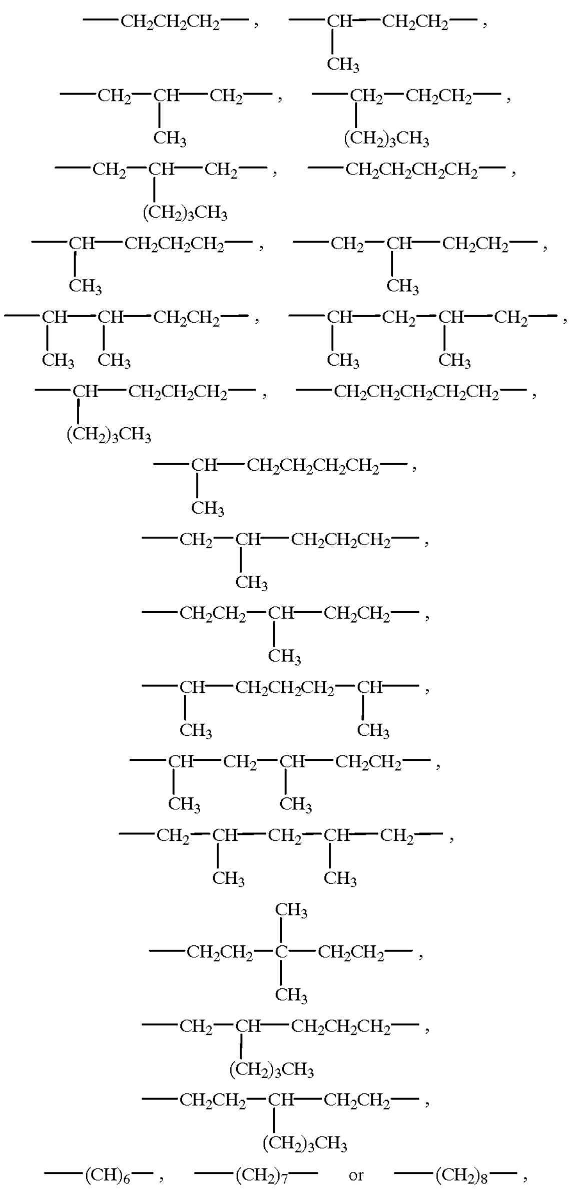

where the variable $Z^1$ can be functionalized or interrupted as stated.

The variables $z^2$ to $Z^4$ in the heterocyclic systems (h), (j) and 5 (k) can be, in particular, $C_2$–$C_{10}$-alkylene groups of the following structure:

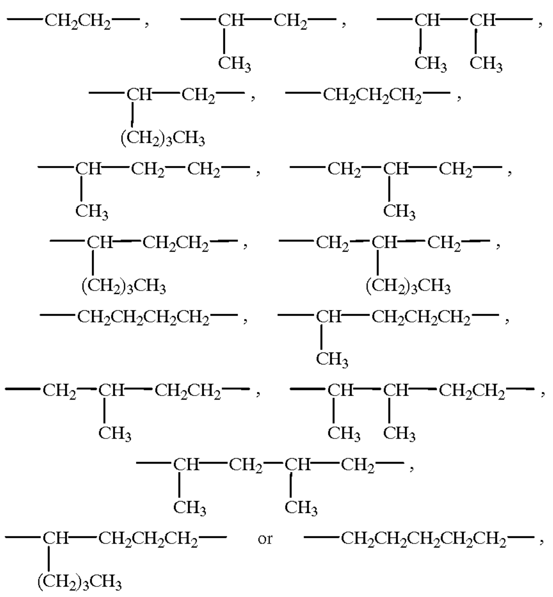

where in the case of asymmetrical alkylene groups both possibilities of incorporation into the rings are possible in principle. The variables $Z^2$ to $Z^4$ can be functionalized or interrupted as stated.

Particularly suitable acyloxy radicals (a) for $L^2$ are:

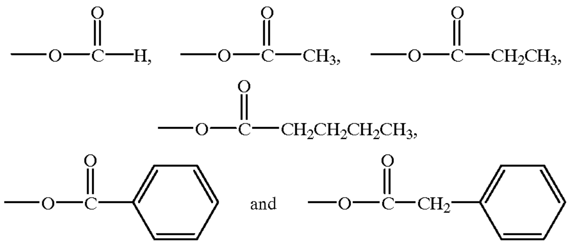

Particularly suitable carboxamido radicals (a) for $L^2$ are:

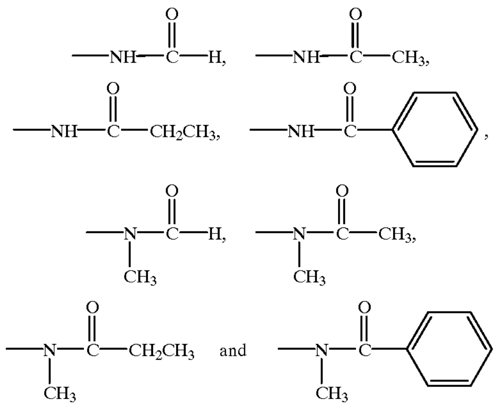

Particularly suitable phenoxy radicals (c) for $L^2$ are:

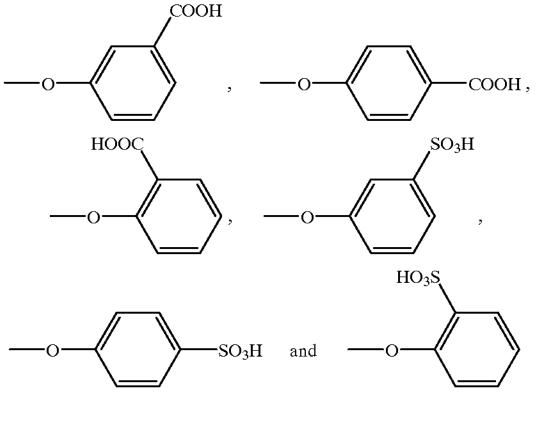

and the relevant sodium or potassium salts.

Particularly suitable vinyloxy radicals (d) for $L^2$ are:

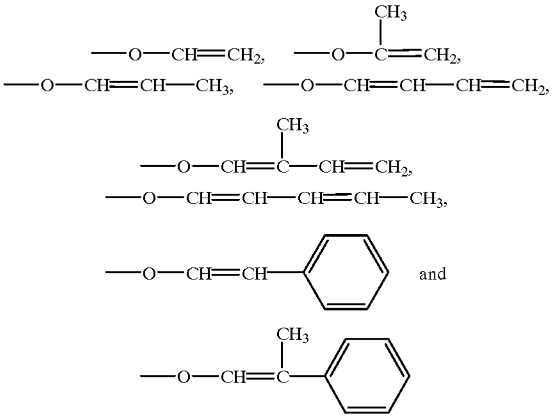

Particularly suitable sulfonamido radicals (e) for $L^2$ are:

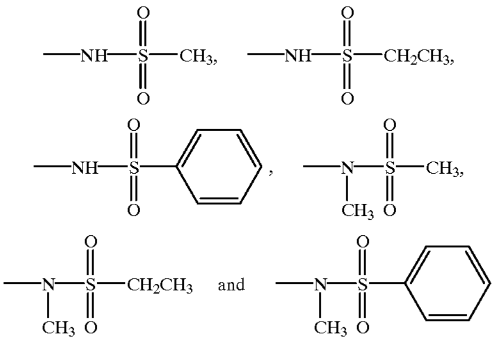

Particularly suitable imidazolyl radicals (f) for $L^2$ are:

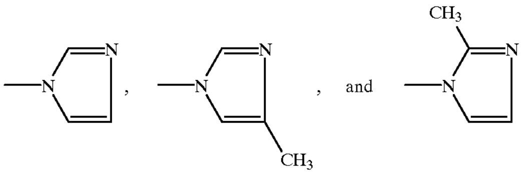

Particularly suitable hydantoin residues (g) for $L^2$ are:

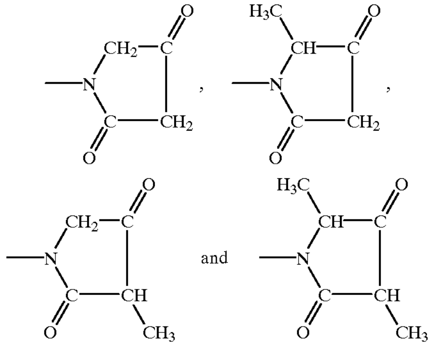

Particularly suitable cyclic carbamate residues (h) for $L^2$ are:

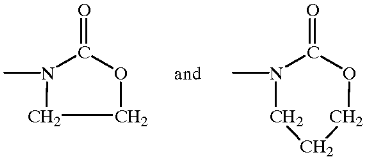

Particularly suitable hydroxylactone residues (j) for $L^2$ are:

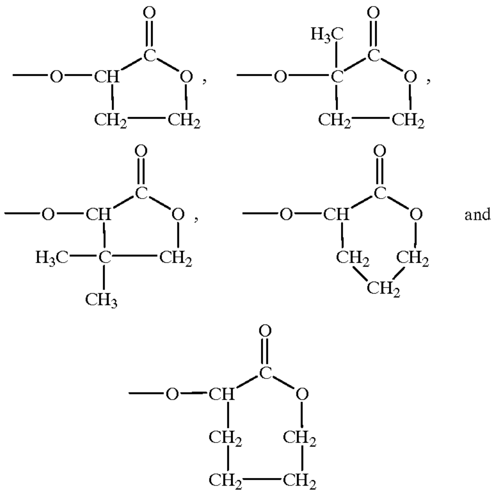

T in the general formula for the hydroxylactone residue (j) is preferably hydrogen or methyl.

Particularly suitable lactam residues (k) for $L^2$ are:

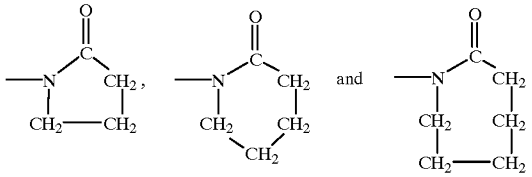

Typical examples of the linker A are the following:

a linear or branched $C_1$–$C_{18}$-alkylene group, in particular $C_6$–$C_{12}$-alkylene group, which may occur is methylene, 1,2-ethylene, 1,1-ethylene, 1,3-propylene, 1,2-propylene, 1,1-propylene, 2,2-propylene, 1,4-butylene, 1,2-butylene, 2,3,-butylene, pentamethylene, 3-methyl-1,5-pentylene, hexamethylene, heptamethylene, octamethylene, nonamethylene, decamethylene, undecamethylene, dodecamethylene, tetradecamethylene, hexadecamethylene or octadecamethylene;

a linear or branched $C_2$–$C_{18}$-alkenylene group, in particular $C_6$–$C_{12}$-alkenylene group, which may occur is a linker with one, two or three olefinic double bonds, eg. 1,2-ethenylene, 1,3-propenylene, 1,4-but-2-enylene, 1,6-hex-3-enylene, 1,8-oct-4-enylene or 1,12-dodec-6-enylene;

suitable $C_5$–$C_{32}$-cycloalkylene groups, in particular $C_5$–$C_{10}$-cycloalkylene groups, are 1,2-, 1,3- or 1,4-cyclohexylene, 1,2-, 1,3- or 1,4-cycloheptylene, 1,2-, 1,3-, 1,4- or 1,5-cyclooctylene or groups of the formula

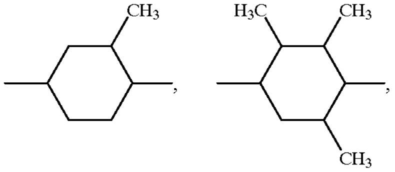

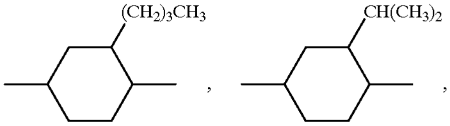

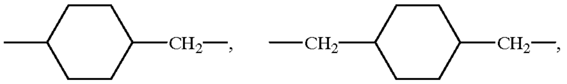

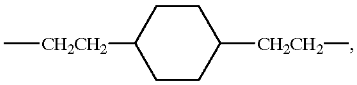

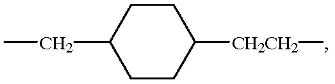

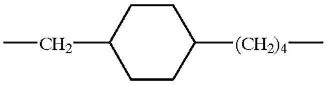

or

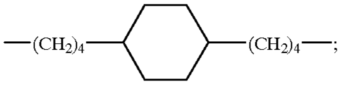

;

suitable $C_7$–$C_{30}$-aralkylene groups, in particular unsubstituted or alkyl-substituted $C_7$–$C_{22}$-phenylalkylene and -diphenylalkylene groups are groups of the formula

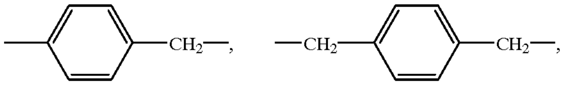

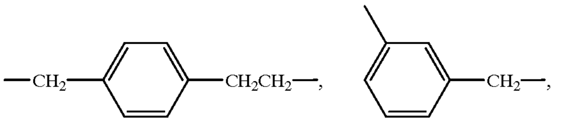

-continued

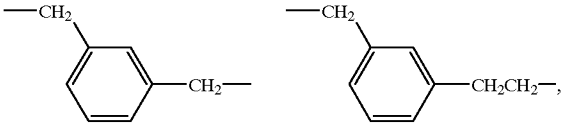

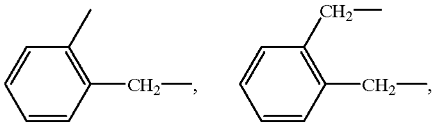

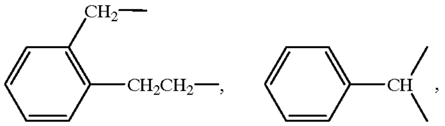

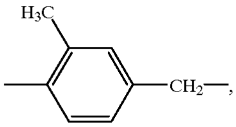

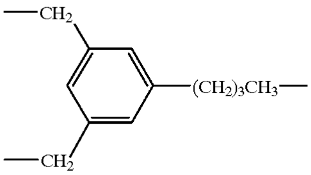

or

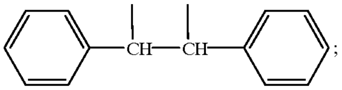

;

particularly suitable $C_6$–$C_{18}$-arylene groups, in particular unsubstituted or alkyl-substituted phenylene, biphenylylene or naphthylene groups, are 1,4-, 1,3- and 1,2-phenylene, but also groups of the formula

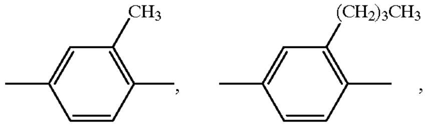

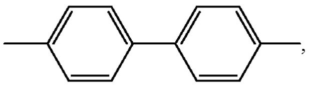

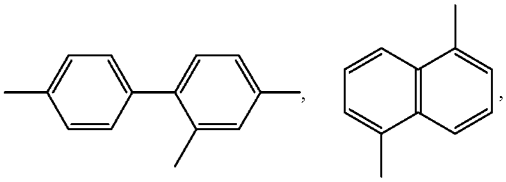

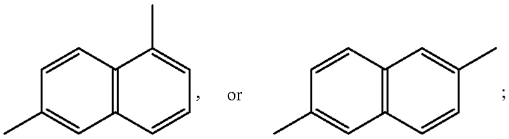

;

suitable $C_6$–$C_{18}$-hetarylene groups, in particular five- or six-membered $C_6$–$C_{12}$-hetarylene groups with one or two heteroatoms from the group of nitrogen, oxygen and sulfur, are groups of the formula:

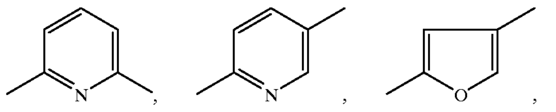

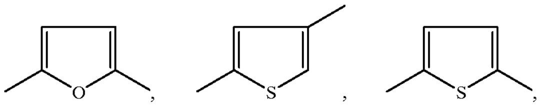

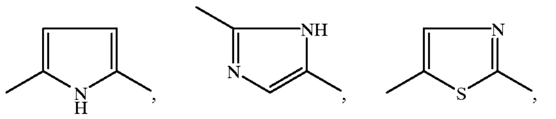

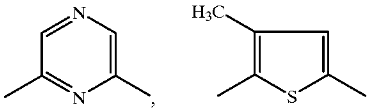

and

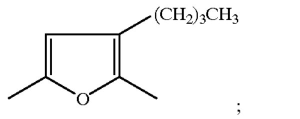

;

examples of suitable structures interrupted by oxygen or amino groups, in particular NH or $N(CH_3)$ groups, are the following structures:

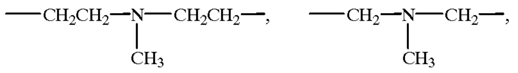

$-CH_2-O-CH_2-$, $-CH_2CH_2-O-CH_2-$, $-CH_2CH_2-O-CH_2CH_2-$, $-CH_2CH_2-(O-CH_2CH_2)_p-$, $-(CH_2)_4-O-(CH_2)_4-$,

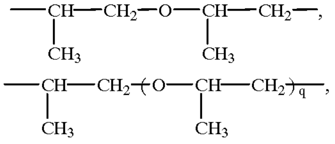

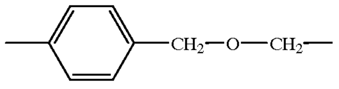

or

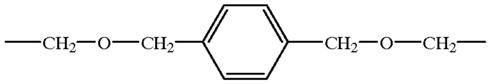

with p=2 to 8 and q=2 to 5.

The linker A is, in particular, a chemical bond (formally derived from oxalic acid) or 1,2-ethylene (derived from succinic acid), 1,4-butylene (derived from adipic acid), hexamethylene (derived 35 from suberic acid), octamethylene (derived from sebacic acid), 1,3- or 1,4-cyclohexylene or 1,2-, 1,3- or 1,4-phenylene (derived from phthalic acid, isophthalic acid or terephthalic acid respectively).

The variables $R^1$, $R^2$, $Z^1$ to $Z^4$ and A defined above can additionally be functionalized by the stated groups. In this connection, $C_1$–$C_4$-alkoxy groups are, in particular, methoxy, ethoxy, n-propoxy, isopropoxy, n-butoxy, isobutoxy, sec-butoxy or tert-butoxy. Preferred amino groups are $-NH_2$, $-NH(CH_3)$, $-NH(CH_2CH_3)$, $-N(CH_3)_2$ and $-N(CH_2CH_3)_2$. Carboxy-$C_1$–$C_4$-alkyl groups are, for example, carboxymethyl, carboxyethyl, carboxypropyl, carboxybutyl or carboxy-tert-butyl.

In a preferred embodiment there is use of oxime esters I in which $L^1$ is an oxime moiety of the formula

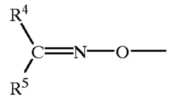

or

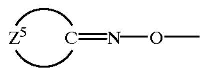

where $R^4$ and $R^5$ are hydrogen, $C_1$–$C_4$-alkyl, especially methyl or ethyl, phenyl or benzyl, and $Z^5$ is 1,4-butylene, 1,5-pentylene or 1,6-hexylene.

Aldoxime or ketoxime moieties of these types-are derived from conventional aldehydes or ketones, for example from formaldehyde, acetaldehyde, propionaldehyde, benzaldehyde, phenylacetaldehyde, acetone, ethyl methyl ketone, diethyl ketone, acetophenone, phenylacetone, benzophenone, cyclopentanone, cyclohexanone or cycloheptanone.

Furthermore, preferred oxime esters I are those where $L^2$ is a second oxime moiety $L^1$; particularly preferred in this connection are those oxime esters I where $L^1$ and $L^2$ are the same oxime moiety.

Particularly interesting bisoxime esters I are those derived from oxalic acid, succinic acid, adipic acid, phthalic acid, isophthalic acid or terephthalic acid and aliphatic ketones with 3 to 6 carbon atoms or from $C_5$–$C_7$-cycloalkanones. Systems of these types can be prepared in a straightforward manner, for example by reacting the corresponding dicarbonyl chlorides or bromides with the appropriate aliphatic or cycloaliphatic ketoximes in the presence of bases.

Also of particular interest as bisoxime esters I are furthermore bisimino carbonates which are formally derived from carbonic acid and aliphatic ketones with 3 to 6 carbon atoms or from $C_5$–$C_7$-cycloalkanones. Systems of this type can be prepared in a straightforward manner, for example by reacting phosgene with the appropriate aliphatic or cycloaliphatic ketoximes in the presence of bases.

The described oxime esters I and methods for preparing them are known in principle, for example from JP-A 06/336 468 (3), WO-A 93/04037 (4) or the article by A. Jumar, P. Held and W. Schulze in Z. Chem. 7 (1967), 344–345 (5). (5) discloses that asymmetrical bisoxime esters I and monooxime esters I can be prepared in the case where m=0 (carbonic acid derivatives) via the corresponding chloroformyloxime as intermediate.

On use according to the invention of the described oxime esters I it is possible to observe an unexpected increase in the oxidizing, bleaching and cleaning action in aqueous washing, bleaching and cleaning liquors which contain inorganic peroxy compounds in the temperature range from 10 to 80° C., in particular 15 to 60° C., especially 20 to 45° C.

The compounds I can be used as activators for inorganic peroxy compounds wherever there is a need for a particular increase in the oxidizing effect of the inorganic peroxy compounds at low temperatures, eg. in the bleaching of textiles, hair or hard surfaces, in the oxidation of organic or inorganic intermediates and in disinfection. Moreover most of these activators have superior properties to the previously disclosed activators.

The compounds I have the further advantage, owing to the fact that, as a rule, they are in a solid state of aggregation at room temperature, they can readily be incorporated stably into detergent, bleach or cleaner formulations which are in powder or granule form.

The compounds I are substances with a neutral odor or a pleasant scent and can therefore be used without difficulty also for detergents and cleaners intended for household use.

It is important for the use according to the invention to create conditions under which, for example, hydrogen peroxide and the compounds I can react together with the aim of obtaining products which have a stronger oxidizing action. Such conditions exist in particular when the two reactants come into contact in aqueous alkaline solution.

The conditions can be varied widely depending on the purpose of use. Thus, besides purely aqueous solutions, also suitable as reaction medium are mixtures of water and suitable organic solvents, eg. for use in disinfection or in the oxidation of intermediates. The pH of the reaction medium can be chosen within wide limits, from the weakly acidic range (pH 4) to the strongly alkaline range (pH 13), depending on the purpose of use. The alkaline range from pH 8 to pH 11 is preferred for the activation reaction because it is particularly advantageous for the stability of the peroxy compound formed.

This is why the described activator is also preferably used together with a sodium perborate or with sodium carbonte perhydrate, solutions of which have pH values in this range. Examples of other suitable peroxy compounds are phosphate perhydrates and urea perhydrate. It may also occasionally be expedient after the activation reaction has taken place to change the pH of the medium again, especially into the acidic range, by suitable additions.

The amounts of peroxy compounds used are generally chosen so that from 10 to 10,000 ppm active oxygen, preferably from 50 to 5000 ppm active oxygen, are present in the solutions. The amount of activator used also depends on the purpose of use. Depending on the required degree of activation, from 0.03 to 1.0 mol, preferably 0.1 to 0.5 mol, of activator is used per mole of inorganic peroxy compound, but amounts above or below these limits may also be used in special cases.

The compounds I can be used for the activation in pure form or, if this is expedient, for example to increase the storage stability, in specific sales forms such as tablets, granules or in fine-particle enveloped form (called prills). Particularly important in this connection are those granular forms produced by agglomeration granulation. Suitable for metering by machine are liquid activators as such or solutions in organic solvents or liquid dispersions which contain the activator.

The preferred use is in preformulated compositions mixed with the peroxy compounds to be activated and, where appropriate, other components necessary for the required bleaching, oxidizing or cleaning process, such as pH-regulating agents and stabilizers for peroxy compounds. It is moreover possible for other conventional activators, besides the compounds I, also to be present. Mixing with selected amounts of peroxy compounds and other additives facilitates use, and the user obtains the required result more reliably because the optimal conditions are set up on dissolving the compositions, without further action. Compositions of these types are in solid form which can preferably be scattered, or else in liquid form.

Particularly suitable additional activators which can be used in combination with the compounds I are:

- polyacylated sugars, eg. pentaacetylglucose;
- acyloxybenzenesulfonic acids and their alkali metal and alkaline earth metal salts, eg. sodium p-isononanoyloxybenzenesulfonate or sodium p-benzoyloxybenzenesulfonate;
- N,N-diacylated and N,N,N',N'-tetraacylated amines, eg. N,N,N',N'-tetraacetylmethylenediamine and -ethylenediamine, N,N-diacetylaniline, N,N-diacetyl-p-toluidine or 1,3-diacylated hydantoins such as 1,3-diacetyl-5,5-dimethylhydantoin;
- N-alkyl-N-sulfonylcarboxamides, eg. N-methyl-N-mesylacetamide or N-methyl-N-mesylbenzamide;
- N-acylated cyclic hydrazides, acylated triazoles or urazoles, eg. monoacetylmaleic hydrazide;
- O,N,N-trisubstituted hydroxylamines, eg. O-benzoyl-N,N-succinylhydroxylamine, O-acetyl-N,N-succinylhydroxylamine or O, N, N-triacetylhydroxylamine;
- N,N'-diacylsulfamides, eg. N,N'-dimethyl-N,N'-diacetylsulfamide or N,N'-diethyl-N,N'-dipropionylsulfamide;
- triacylcyanurates, eg. triacetylcyanurate or tribenzoylcyanurate;
- carboxylic anhydrides, eg. benzoic anhydride, m-chlorobenzoic anhydride or phthalic anhydride;
- 1,3-diacyl-4,5-diacyloxyimidazolines, eg. 1,3-diacetyl-4,5-diacetoxyimidazoline;
- tetraacetylglycoluril and tetrapropionylglycoluril;
- diacylated 2,5-diketopiperazines, eg. 1,4-diacetyl-2,5-diketopiperazine;
- products of the acylation of propylenediurea and 2,2-dimethylpropylenediurea, eg. tetraacetylpropylenediurea;
- α-acyloxypolyacylmalonamides, eg. α-acetoxy-N,N'-diacetylmalonamide;
- diacyldioxohexahydro-1,3,5-triazines, eg. 1,5-diacetyl-2,4-dioxohexahydro-1,3,5-triazine;
- benz-(4H)1,3-oxazin-4-ones with alkyl radicals, eg. methyl, or aromatic radicals, eg. phenyl, in position 2.

A particularly interesting use of the compounds I is as cold bleach activators or optical brighteners in detergents, cleaners and bleaches, especially in detergents and bleaches and bleach additives for textile laundering, and in disinfectants.

The present invention also relates to detergents and bleaches for textile laundering which contain from 0.1 to 20% by weight, preferably 0.5 to 10% by weight, based on the total amount of the formulation, of one or more compounds I.

In the area of textile laundering, of bleaching and of cleaning in the household and in the commercial sector it is possible to combine the described activators with virtually all conventional ingredients of detergents, bleaches and cleaners. It is possible in this way, for example, to design compositions which are specifically suitable for textile treatment at low temperatures, and those which are suitable in several temperature ranges even up to the traditional boiling wash range.

The main ingredients of detergents, bleaches and cleaners are, besides peroxy compounds and activators, builders, ie. inorganic builders and/or organic cobuilders, and surfactants, especially anionic and/or nonionic surfactants. It is also possible for other conventional auxiliaries and accompanying substances, such as fillers, complexing agents, phosphonates, dyes, corrosion inhibitors, antiredeposition agents and/or soil release polymers, color transfer inhibitors, bleach catalysts, peroxide stabilizers, electrolytes, optical brighteners, enzymes, perfume oils, foam regulators and activating substances, to be present in these compositions if this is expedient.

Inorganic Builders

Suitable inorganic builders are all conventional inorganic builders such as alumosilicates, silicates, carbonates and phosphates.

Examples of suitable inorganic builders are alumosilicates with ion-exchanging properties such as zeolites. Various types of zeolites are suitable, especially zeolites A, X, B, P, MAP and HS in their Na form or in forms in which Na is partly replaced by other cations such as Li, K, Ca, Mg or ammonium. Suitable zeolites are described, for example, in EP-A 038 591, EP-A 021 491, EP-A 087 035, U.S. Pat. No. 4,604,224, GB-A 2 013 259, EP-A 522 726, EP-A 384 070 and WO-A 94/24 251.

Further suitable inorganic builders are, for example, amorphous or crystalline silicates such as amorphous disilicates, crystalline disilicates such as the sheet silicate SKS-6 (manufactured by Hoechst). The silicates can be used in the form of their alkali metal, alkaline earth metal or ammonium salts. Na, Li and Mg silicates are preferably used.

Anionic Surfactants

Suitable anionic surfactants are, for example, fatty alcohol sulfates of fatty alcohols with 8 to 22, preferably 10 to 18, carbon atoms, eg. $C_9$–$C_{11}$-alcohol sulfates, $C_{12}$–$C_{13}$-alcohol sulfates, cetyl sulfate, myristyl sulfate, palmityl sulfate, stearyl sulfate and tallow fatty alcohol sulfate.

Other suitable anionic surfactants are sulfated ethoxylated $C_8$–$C_{22}$-alcohols (alkyl ether sulfates) and their soluble salts. Compounds of this type are prepared, for example, by initially alkoxylating a $C_8$–$C_{22}$-, preferably a $C_{10}$–$C_{18}$-alcohol, eg. a fatty alcohol, and then sulfating the alkoxylation product. Ethylene oxide is preferably used for the alkoxylation, employing from 2 to 50, preferably 3 to 20, mol of ethylene oxide per mole of fatty alcohol. However, the alkoxylation of the alcohols can also be carried out with propylene oxide alone and, where appropriate, butylene oxide. Also suitable are alkoxylated $C_8$–$C_{22}$-alcohols which contain ethylene oxide and propylene oxide or ethylene oxide and butylene oxide. The alkoxylated $C_8$–$C_{22}$-alcohols can contain the ethylene oxide, propylene oxide and butylene oxide units in the form of blocks or in random distribution.

Other suitable anionic surfactants are alkanesulfonates such as $C_8$–$C_{24}$-, preferably $C_{10}$–$C_{18}$-alkanesulfonates, and soaps such as the salts of $C_8$–$C_{24}$-carboxylic acids.

Other suitable anionic surfactants are $C_9$–$C_{20}$-linear-alkylbenzenesulfonates (LAS).

The anionic surfactants are preferably added to the detergent in the form of salts. Suitable cations in these salts are alkali metal ions such as sodium, potassium and lithium and ammonium ions, eg. hydroxethylammonium, di(hydroxyethyl)ammonium and tri(hydroxyethyl) ammonium ions.

Nonionic Surfactants

Examples of suitable nonionic surfactants are alkoxylated $C_8$–$C_{22}$-alcohols such as fatty alcohol alkoxylates or oxo alcohol alkoxylates. The alkoxylation can be carried out with ethylene oxide, propylene oxide and/or butylene oxide. It is possible to use as surfactant in this case all alkoxylated alcohols which contain at least two molecules of an above-mentioned alkylene oxide in the adduct. Also suitable in this case are block polymers of ethylene oxide, propylene oxide and/or butylene oxide, or adducts containing said alkylene oxides in random distribution. From 2 to 50, preferably 3 to 20, mol of at least one alkylene oxide are used per mole of alcohol. Ethylene oxide is preferably used as alkylene oxide. The alcohols preferably have 10 to 18 carbon atoms.

Another class of suitable nonionic surfactants comprises alkylphenol ethoxylates with $C_6$–$C_{14}$-alkyl chains and 5 to 30 mol of ethylene oxide units.

Another class of nonionic surfactants comprises alkyl polyglucosides with 8 to 22, preferably 10 to 18, carbon atoms in the alkyl chain. These compounds usually contain from 1 to 20, preferably 1.1 to 5, glucoside units.

Another class of nonionic surfactants comprises N-alkylglucamides of the general structure II or III (II)

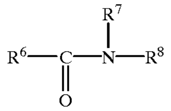

(III)

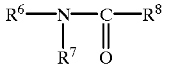

where $R^6$ is $C_6$–$C_{22}$-alkyl, $R^7$ is H or $C_1$–$C_4$-alkyl and $R^8$ is a polyhydroxyalkyl radical with 5 to 12 carbon atoms and at least 3 hydroxyl groups. Preferably $R^6$ is $C_{10}$–$C_{18}$-alkyl, $R^7$ is methyl and $R^8$ is a $C_5$ or $C_6$ radical. Compounds of this type are obtained, for example, by acylating reductively aminated sugars with acid chlorides of $C_{10}$–$C_8$-carboxylic acids.

The detergents according to the invention preferably contain $C_{10}$–$C_{16}$-alcohols ethoxylated with 3–12 mol of ethylene oxide, particularly preferably ethoxylated fatty alcohols, as nonionic surfactants.

Organic Cobuilders

Examples of suitable low molecular weight polycarboxylates as organic cobuilders are:

$C_4$–$C_{20}$-di-, -tri- and -tetracarboxylic acids such as succinic acid, propanetricarboxylic acid, butanetetracarboxylic acid, cyclopentanetetracarboxylic acid and alkyl- and alkylenesuccinic acids with $C_2$–$C_{16}$-alkyl and -alkylene radicals respectively;

$C_4$–$C_{20}$-hydroxy carboxylic acids such as malic acid, tartaric acid, gluconic acid, glutaric acid, citric acid, lactobionic acid and sucrosemono-, -di- and -tricarboxylic acids;

amino polycarboxylates such as nitrilotriacetic acid, methylglycinediacetic acid, alaninediacetic acid, ethylenediaminetetraacetic acid and serinediacetic acid;

salts of phosphonic acids such as hydroxyethanediphosphonic acid, ethylenediaminetetra (methylenephosphonate) and diethylenetriaminepenta (methylenephosphonate).

Examples of suitable oligomeric or polymeric polycarboxylates as organic cobuilders are:

oligomaleic acids as described, for example, in EP-A 451508 and EP-A 396303;

co- and terpolymers of unsaturated $C_4$–$C_8$-dicarboxylic acids, possible comonomers being monoethylenically unsaturated monomers from group (i) in amounts of up to 95% by weight from group (ii) in amounts of up to 60% by weight from group (iii) in amounts of up to 20% by weight.

Examples of suitable unsaturated $C_4$–$C_8$-dicarboxylic acids in this case are maleic acid, fumaric acid, itaconic acid and citraconic acid. Maleic acid is preferred.

Group (i) comprises monoethylenically unsaturated $C_3$–$C_8$-monocarboxylic acids such as acrylic acid, methacrylic acid, crotonic acid and vinylacetic acid. Acrylic acid and methacrylic acid are preferably used from group (i).

Group (ii) comprises monoethylenically unsaturated $C_2$–$C_{22}$-olefins, vinyl alkyl ethers with $C_1$–$C_8$-alkyl groups, styrene, vinyl esters of $C_1$–$C_8$-carboxylic acids, (meth) acrylamide and vinylpyrrolidone. $C_2$–$C_6$-Olefins, vinyl alkyl ethers with $C_1$–$C_4$-alkyl groups, vinyl acetate and vinyl propionate are preferably used from group (ii).

Group (iii) comprises (meth)acrylic esters of $C_1$–$C_8$-alcohols, (meth)acrylonitrile, (meth)acrylamides of $C_1$–$C_8$-amines, N-vinylformamide and vinylimidazole.

If vinyl esters are used as group (ii) monomers in the polymers, these can also partially or completely hydrolyzed to vinyl alcohol structural units. Suitable co- and terpolymers are disclosed, for example, in U.S. Pat. No. 3,887,806 and DE-A 43 13 909.

Suitable and preferred copolymers of dicarboxylic acids as organic cobuilders are:

- copolymers of maleic acid and acrylic acid in the ratio from 10:90 to 95:5 by weight, particularly preferably those in the ratio from 30:70 to 90:10 by weight with molecular weights of from 10,000 to 150,000;
- terpolymers of maleic acid, acrylic acid and a vinyl ester of a $C_1$–$C_3$-carboxylic acid in the ratio by weight from 10 (maleic acid):90 (acrylic acid+vinyl ester) to 95 (maleic acid):10 (acrylic acid+vinyl ester), it being possible for the ratio by weight of acrylic acid to vinyl ester to vary in the range from 20:80 to 80:20, and particularly preferably terpolymers of maleic acid, acrylic acid and vinyl acetate or vinyl propionate in the ratio by weight from 20 (maleic acid):80 (acrylic acid+vinyl ester) to 90 (maleic acid):10 (acrylic acid+ vinyl ester), it being possible for the ratio by weight of acrylic acid to vinyl ester to vary in the range from 30:70 to 70:30;
- copolymers of maleic acid with $C_2$–$C_8$-olefins in the molar ratio from 40:60 to 80:20, with copolymers of maleic acid with ethylene, propylene or isobutene in the molar ratio 50:50 being particularly preferred.

Graft copolymers of unsaturated carboxylic acids on low molecular 10 weight carbohydrates or hydrogenated carbohydrates, cf. U.S. Pat. No. 5,227,446, DE-A 4415623, DE-A 4313909, are also suitable as organic cobuilders.

Suitable unsaturated carboxylic acids in this connection are, for example, maleic acid, fumaric acid, itaconic acid, citraconic acid, acrylic acid, methacrylic acid, crotonic acid and vinylacetic acid, and mixtures of acrylic acid and maleic acid, which are grafted in amounts of from 40 to 95% of the weight of the component to be grafted.

It is additionally possible for up to 30% by weight, based on the component to be grafted, of other monoethylenically unsaturated monomers to be present in the polymer for modification. Suitable modifying monomers are the above-mentioned monomers of groups (ii) and (iii).

Suitable as grafting base are degraded polysaccharides such as acidically or enzymatically degraded starches, inulins or cellulose, reduced (hydrogenated or reductively aminated) degraded polysaccharides such as mannitol, sorbitol, aminosorbitol and glucamine, and polyalkylene glycols with molecular weight of up to $M_W$=5000, such as polyethylene glycols, ethylene oxide/propylene oxide and ethylene oxide/butylene oxide block copolymers, random ethylene oxide/propylene oxide or ethylene oxide/butylene oxide copolymers, alkoxylated monohydric or polyhydric $C_1$–$C_{22}$-alcohols, cf. U.S. Pat. No. 4,746,456.

Preferably used from this group are grafted degraded or degraded reduced starches and grafted polyethylene oxides, employing 20 to 80% by weight of monomers based on the grafting component in the graft copolymerization. A mixture of maleic acid and acrylic acid in the ratio of from 90:10 to 10:90 by weight is preferably used for the grafting.

Polyglyoxylic acids are described as organic cobuilders, for example, in EP-B 001004, U.S. Pat. No. 5,399,286, DE-A 4106355 and EP-A 656914. The end groups of the polyglyoxylic acids may have different structures.

Polyamido carboxylic acids and modified polyamido carboxylic acids are disclosed as organic cobuilders, for example, in EP-A 454126, EP-B 511037, WO-A 94/01486 and EP-A 581452.

Also preferably used as organic cobuilders are polyaspartic acid or cocondensates of aspartic acid with other amino acids, $C_4$–$C_{25}$-mono- or -dicarboxylic acids and/or $C_4$–$C_{25}$-mono- or -diamines. Particularly preferably used are polyaspartic acids which have been prepared in phosphorous-containing acids and are modified with $C_6$–$C_{22}$-mono- or -dicarboxylic acids or with $C_6$–$C_{22}$-mono- or -diamines.

Condensates of citric acid with hydroxy carboxylic acids or polyhydroxy compounds are disclosed as organic cobuilders, for example, in WO-A 93/22362 and WO-A 92/16493. Carboxyl-containing condensates of this type normally have molecular weights of up to 10,000, preferably up to 5000.

Antiredeposition Agents and Soil Release Polymers

Examples of suitable soil release polymers and/or antiredeposition agents for detergents are:

- polyesters from polyethylene oxides with ethylene glycol and/or propylene glycol and aromatic dicarboxylic acids or aromatic and aliphatic dicarboxylic acids;
- polyesters from polyethylene oxides which are endgroup-capped at one end with dihydric and/or polyhydrdic alcohols and dicarboxylic acid.

Polyesters of these types are known, for example from U.S. Pat. No. 3,557,039, GB-A 1154730, EP-A 185427, EP-A 241984, EP-A 241985, EP-A 272033 and U.S. Pat. No. 5,142,020.

Other suitable soil release polymers are amphiphilic graft copolymers of vinyl and acrylic esters on polyalkylene oxides (cf. U.S. Pat. No. 4,746,456, U.S. Pat. No. 4,846,995, DE-A 3711299, U.S. Pat. No. 4,904,408, U.S. Pat. No. 4,846,994 and U.S. Pat. No. 4,849,126) or modified celluloses such as methylcellulose, hydroxypropylcellulose or carboxymethylcellulose.

Color Transfer Inhibitors

Examples of color transfer inhibitors used are homo- and copolymers of vinylpyrrolidone, of vinylimidazole, of vinyloxazolidone and of 4-vinylpyridine N-oxide with molecular weights of from 15,000 to 100,000, and crosslinked fine-particle polymers based on these monomers. The use mentioned herein of such polymers is known, cf. DE-B 2232353, DE-A 2814287, DE-A 2814329 and DE-A 4316023.

Enzymes

Suitable enzymes are proteases, lipases, amylases and cellulases. The enzyme system can be confined to a single enzyme or comprise a combination of various enzymes.

Bleach Catalysts

Suitable bleach catalysts are quaternized imines and sulfone imines (cf. U.S. Pat. No. 5,360,568, U.S. Pat. No. 5,360,569 and EP-A 453003) and manganese complexes (cf. WO-A 94/21777).

Use in detergents and bleaches for textile laundering

The activators of the oxime ester structure I to be used according to the invention are preferably employed in detergents in powder or granule form. These may be conventional heavy duty detergents or concentrated or compacted detergents.

A typical heavy duty detergent according to the invention in powder or granule form may have the following composition, for example:

- 0.5–50, preferably 5–30, % by weight of at least one anionic and/or nonionic surfactant,
- 0.5–60, preferably 15–40, % by weight of at least one inorganic builder,

- 0–20, preferably 0.5–8, % by weight of at least one organic cobuilder,
- 2–35, preferably 5–30, % by weight of an inorganic bleach,
- 0.1–20, preferably 0.5–10, % by weight of a bleach activator according to the invention, where appropriate mixed with other bleach activators,
- 0–1, preferably up to a maximum of 0.5, % by weight of a bleach catalyst,
- 0–5% by weight, preferably 0–2.5%, of a polymeric color transfer inhibitor,
- 0–1.5% by weight, preferably 0.1–1.0% by weight, of protease,
- 0–1.5% by weight, preferably 0.1–1.0% by weight of lipase,
- 0–1.5% by weight, preferably 0.2–1.0% by weight of a soil release polymer, ad 100% conventional auxiliaries and accompanying substances and water.

Inorganic builders which are preferably employed in detergents are sodium carbonate, sodium bicarbonate, zeolites A and P and amorphous and crystalline Na silicates.

Organic cobuilders which are preferably employed in detergents are acrylic acid/maleic acid copolymers, acrylic acid/maleic acid/vinyl ester terpolymers and citric acid.

Inorganic bleaches preferably employed in detergents are sodium perborate and sodium carbonate perhydrate.

Inorganic surfactants preferably employed in detergents are fatty alcohol sulfates, linear alkylbenzenesulfonates (LAS) and soaps, with the LAS content preferably being below 8% by weight, particularly preferably below 4% by weight.

Nonionic surfactants preferably employed in detergents are $C_{11}$–$C_{17}$-oxo alcohol ethoxylates with 3–13 ethylene oxide units, $C_{10}$–$C_{16}$-fatty alcohol ethoxylates with 3–13 ethylene oxide units, and ethoxylated fatty or oxo alcohols additionally alkoxylated with 1–4 propylene oxide or butylene oxide units.

Enzymes preferably employed in detergents are protease, lipase and cellulase. Commercial enzymes are, as a rule, added to the detergents in amounts of from 0.1 to 1.5% by weight, preferably 0.2 to 1.0% by weight, of the formulated enzyme. Examples of suitable proteases are Savinase and Esperase (manufactured by Novo Nordisk). An example of a suitable lipase is Lipolase (manufactured by Novo Nordisk). An example of a suitable cellulase is Celluzym (manufactured by Novo Nordisk).

Antiredeposition agents and soil release polymers preferably employed in detergents are graft copolymers of vinyl acetate on polyethylene oxide of molecular weight 2500–8000 in the ratio of from 1.2:1 to 3.0:1 by weight, polyethylene terephthalates/oxyethylene terephthalates of molecular weight 3000–25,000 from polyethylene oxides of molecualr weight 750–5000 with terephthic acid and ethylene oxide and a molar ratio of polyethylene tererphthalate to polyoxyethylene terephthalate of from 8:1 to 1:1, and block polycondensates as disclosed in DE-A 4403866.

Color transfer inhibitors preferably employed in detergents are soluble vinylpyrrolidone and vinylimidazole copolymers with molecular weights above 25,000, and fine-particle crosslinked polymers based on vinylimidazole.

The detergents according to the invention in powder or granule form may contain up to 60% by weight of inorganic fillers. Sodium sulfate is normally used for this purpose. However, the detergents according to the invention preferably have a low filler content not exceeding 20% by weight, particularly preferably not exceeding 8% by weight of fillers.

The detergents according to the invention may have apparent densities varying in the range from 300 to 1200, in partiuclar 500 to 950, g/l. Modern compact detergents as a rule have high apparent densities and a granular structure.

Besides combined detergents and bleaches, suitable formulations of the described activators for textile laundering are also compositions used as additives to peroxide-containing or peroxide-free detergents. They essentially contain activator or a mixture of activator and peroxy compound and, where appropriate, other auxiliaries and additives, in particular stabilizers, pH regulators, thickeners and surfactants.

The present invention furthermore relates to bleach additives for textile laundering which contain 1–30% by weight, preferably 5–25% by weight, based on the total amount of the additive formulation, of one or more compounds I.

Typical bleach additives of this type have approximately the following composition:

- 5–50% by weight, preferably 15–35% by weight, of inorganic peroxy compound,
- 1–30% by weight, preferably 5–25% by weight, of compounds I, 0–5% by weight, preferably 0.1–3% by weight, of peroxide stabilizers,
- 0–40% by weight, preferably 5–30% by weight, of pH regulators,
- ad 100% by weight of other conventional auxiliaries and additives.

The present invention also relates to dishwashing compositions which contain 0.05–15% by weight, preferably 0.1–10% by weight, in particular 0.5–5% by weight, in each case based on the total amount of the formulation, of one or more compounds I in addition to ingredients customary for this purpose.

Compositions intended for cleaning hard surfaces generally contain, besides peroxy compound and activator, in particular surfactants, builders and, in the case of polishing and scouring compositions, ingredients with an abrasive action. Since these compositions are often used at room temperature, in this case the use of the activators according to the invention have a particularly advantageous effect on the bleaching and germicidal action.

Formulated compositions are particularly important for the disinfection application because for this in general there are increased requirements for safety of use. Disinfectants based on the described activators generally contain, besides the latter and inorganic peroxy compounds, also other auxiliaries and additives such as pH regulators, stabilizers and surfactants. In special cases they may additionally contain specific microbicides which enhance the destructive effect, which is intrinsically very broad, of the activated peroxy compound for particular germs.

The present invention furthermore relates to disinfectants which contain 1–40% by weight, preferably 5–30% by weight, based on the total amount of the formulation, of one or more compounds I.

Typical disinfectants of this type have approximately the following composition:

- 5–40% by weight, preferably 10–20% by weight, of inorganic peroxy compound,
- 1–40% by weight, preferably 5–30% by weight, of compounds I,
- 0–5% by weight, preferably 0.1–3% by weight, of peroxide stabilizers,
- 0.1–20% by weight, preferably 0.2–5% by weight, of surfactant,
- ad 100% by weight of other auxiliaries and additives.

The use according to the invention of the described activators is, however, by no means confined to use in the form formulated as described herein or in other ways. Thus, for example, in the commercial sector preference is generally given to individual dosage of reagents because it often represents the more economic method.

It is possible with the compounds I to achieve a distinct improvement in the bleaching, oxidizing and cleaning action in the lower temperature range for the industrial applications described.

PREPARATION EXAMPLES

General Preparation Method for Reaction with Solid or Liquid Dicarbonyl Chlorides 0.2 mol of the oxime is placed in a round-bottom flask and dissolved in 60 g of pyridine with stirring. At 20–30° C., 0.1 mol of the dicarbonyl chloride is added dropwise over the course of 10–20 minutes. Cooling is necessary if the reaction is exothermic. After stirring at room temperature for 2 hours, the reaction mixture is introduced into 800 ml of water and extracted three times with 200 ml of methyl tert-butyl ether each time. The combined organic phases are washed with water, dried over sodium sulfate and filtered, and the solvent is removed.

Example 1

Preparation of Bis(acetone oxime) Isophthalate

The title compound was prepared from acetone oxime and isophthaloyl chloride as a white solid with a purity of 95% in a yield of 80% by the above general preparation method.

Example 2

Preparation of Bis(acetone oxime) Adipate

The title compound was prepared from acetone oxime and adipoyl chloride as a white solid with a purity of 95% in a yield of 96% by the above general preparation method.

Example 3

Preparation of Bis(acetone oxime) Terephthalate

The title compound was prepared from acetone oxime and terephthaloyl chloride as a pale solid with a purity of 90% in a (non-optimized) yield of 18% by the above general preparation method.

Example 4

Preparation of Bis(acetone oxime) Carbonate 39.2 g (525 mmol) of acetone oxime (98% pure) were dissolved in 500 ml of dichloromethane in a round-bottom flask. To this were added 53.3 g (530 nmol) of triethylamine and then, at 0–10° C., 25 g (250 mmol) of phosgene were passed in. The reaction mixture was then stirred at room temperature for 5 hours. The triethylamine hydrochloride was removed by washing with 250 ml of saturated $NaHCO_3$ solution and with 250 ml of saturated aqueous NaCl solution. The organic phase was dried over sodium sulfate and filtered, and the solvent was removed. The title compound was obtained as a white solid of melting point 74–75° C. with a purity of 98% in 100% yield.

Examples of Use in Textile Detergents

The use tests were carried out with the heavy duty detergent formulations in Table 1 below. The formulations in Table 1 represent the basic compositions of the detergents according to the invention.

TABLE 1

Formulations for heavy duty detergents [composition in % by weight]

| | I | II | III | IV | V | VI | VII |
|---|---|---|---|---|---|---|---|
| PVP (K value 30) | 1.5 | | | | | | |
| VI/VP copolymer (K value 30) | | 1.0 | | | | 0.6 | |
| VI/VP copolymer crosslinked | | | | | 1.0 | | 1.0 |
| AA/MA (70,000) | | | 5.0 | | | | |
| AA/MA (10,000) | | | | | | | 5.0 |
| AA/MA/VAc terpolymer (20,000) | | | | | | 5.0 | |
| Oligomaleic acid | | | | | 5.0 | | |
| Polyaspartic acid | 7.5 | | | | | | |
| NA perborate monohydrate | 15 | 15 | | | 15 | | 7.5 |
| Na percarbonate | | | 18 | 15 | | 18 | |
| Activator from Example 4 | | 3.8 | | 5.0 | | 4.2 | 2.0 |
| Activator from Example 1, 2 or 3 | 4.0 | | 5.0 | | 2.9 | | |
| Na lauryl sulfate | | 6.0 | 12.0 | 6.0 | 5.5 | | |
| Linear Na alkylbenzenesulfonate | 3.1 | 1.7 | 0.8 | | | 6.5 | |
| Soap | 2.8 | 0.6 | 0.4 | 2.5 | 1.5 | | 2.4 |
| C13/C15 oxo alcohol* 3 EO | | 3.0 | | | | | |
| C13/C15 oxo alcohol* 7 EO | 4.7 | | 4.7 | 13.5 | 4.0 | 6.5 | |
| C13/C15 oxo alcohol* 10 EO | | 3.0 | | | | | |
| C12/C14-fatty alcohol* 7 EO | | | | | | | 10.0 |
| Lauryl alcohol* 13 EO | | | | | | 5.0 | |
| Zeolite A | 25 | 25 | 15 | | 30 | 15 | 35 |
| Zeolite P | | | | 40 | | | |
| SKS-6 | | | 14 | | | 15 | |
| Na disilicate | 2.5 | 3.9 | | 0.5 | 4.5 | | 1.5 |
| Mg silicate | 1.0 | | 0.8 | | 1.0 | 1.0 | 0.6 |
| Sodium sulfate | 20 | 2.5 | 3.2 | 2.0 | 1.5 | 5.5 | 3.4 |
| Sodium bicarbonate | | | 9.0 | 6.5 | | | |
| Sodium carbonate | 12.0 | 13.6 | | | 10.0 | 8.0 | 9.8 |
| Soil release polymer I | | 0.4 | | | 0.5 | | |
| Soil release polymer II | 1.0 | | | | 0.5 | 0.8 | 1.0 |

TABLE 1-continued

| Formulations for heavy duty detergents [composition in % by weight] | I | II | III | IV | V | VI | VII |
|---|---|---|---|---|---|---|---|
| Carboxymethylcellulose | 0.6 | 1.3 | 0.6 | 1.0 | 0.6 | 0.6 | 0.5 |
| Commercial phosphonate | | | | 0.5 | | | |
| Citric acid | | 6.8 | 5.0 | | | 2.5 | 3.8 |
| Lipase | | | | | 1.0 | | |
| Protease | | 1.0 | | | 1.0 | 0.5 | 0.6 |
| Cellulase | | | | | | | 0.6 |
| Water | to 100 | to 100 | to 100 | to 100 | to 100 | to 100 | to 100 |

Abbreviations:
PVP Polyvinylpyrrolidone
VI/VP Vinylimidazole/Vinylpyrrolidone
SKS-6 Sheet silicate Na salt (manufactured by Hoechst)
EO Ethylene oxide
AA/MA (70,000) Acrylic acid/maleic acid copolymer in the ratio 70:30 by weight with molecular weight Mw = 70,000
AA/MA (10,000) Acrylic acid/maleic acid copolymer in the ratio 40:60 by weight with molecular weight Mw = 10,000
AA/MA/VAc (20,000) Acrylic acid/maleic acid/vinyl acetate terpolymer in the molar ratio 40:10:50 with molecular weight Mw = 20,000
Soil release polymer I Graft copolymer of vinyl acetate on polyethylene glycol of molecular weight 6000, molecular weight of the graft copolymer 24,000
Soil release polymer II Polyethylene terephthalate/polyoxyethylene terephthalate of molecular weight 8000

To test the action of the bleach activators according to the invention, washing tests were carried out in detergents III and IV with test stains of red wine, tea or grass on cotton, and in most cases the bleaching actions achieved were better than with N,N,N',N'-tetraacetylethylenediamine (TAED) which is the activator customarily used. The activators according to the invention have the advantage, compared with other oxime esters disclosed in the cited patent applications (1) and (2), that, as a rule, they are crystalline and thus can more easily be incorporated stably into detergents in powder form.

The test was carried out in a launder-O-meter, Atlas Standard type, under the conditions specified in Tab. 2.

TABLE 2

| Washing conditions | |
|---|---|
| Machine | Launder-O-meter |
| Cycles | 1 |
| Time | 30 min |
| Temperatures | 22° C., 38° C. and 60° C. |
| Water hardness | 3.0 mmol/l |

TABLE 2-continued

| Washing conditions | |
|---|---|
| Machine | Launder-O-meter |
| Test fabric | 5 × 2.5 g of various test fabrics (bleached cotton, cotton cheesecloth, EMPA 115 colored fabric stained with red wine, tea, grass) |
| Amount of liquor | 250 ml |
| Liquor ratio | 1:20 |
| Detergent | Nos. III and IV from Tab. 1 using the activator indicated in Tab. 3 |
| Detergent concentration | 4.5 g/l |

The color strength of the test fabric was measured by photometry. The color strengths of each of the test stains before and after washing were determined from the reflectance measurements at 18 wavelengths in the range from 400 to 700 nm, 20 nm apart, on the individual test fabrics by the method described in A. Kud, Seifen, Öle, Fette, Wachse 119 (1993) 590–594, and the absolute bleaching action $A_{abs}$ in % was calculated from this.

TABLE 3

Results of washing tests with soiled test fabrics (absolute bleaching action $A_{abs}$ in %)

| Bleach activator | Detergent formulation | Tea 22° C. | Tea 38° C. | Red wine 22° C. | Red wine 38° C. | Grass 22° C. | Grass 38° C. |
|---|---|---|---|---|---|---|---|
| Example No. 1 | III | 51.4 | 72.2 | 68.9 | 84.2 | 28.7 | 32.3 |
| Example No. 2 | III | 51.6 | 72.4 | 69.6 | 84.1 | 25.1 | 32.8 |
| Example No. 3 | III | 40.2 | 69.2 | 63.9 | 81.3 | 25.2 | 32.5 |
| For comp.: TAED (same amount as above) | III | 43.5 | 71.8 | 66.3 | 85.9 | 25.1 | 32.7 |
| For comparison: no activator | III | 9.9 | 41.6 | 57.0 | 67.6 | 24.8 | 30.2 |
| Example No. 4 | IV | 41.2 | 61.0 | 71.9 | 76.1 | 31.5 | 38.3 |

TABLE 3-continued

| | Results of washing tests with soiled test fabrics (absolute bleaching action $A_{abs}$ in %) | | | | | | |
|---|---|---|---|---|---|---|---|
| | Detergent | Tea | | Red wine | | Grass | |
| Bleach activator | formulation | 22° C. | 38° C. | 22° C. | 38° C. | 22° C. | 38° C. |
| For comp.: TAED (same amount as above) | IV | 30.2 | 55.7 | 72.4 | 80.1 | 28.9 | 35.3 |
| For comparison: no activator | IV | 2.3 | 5.8 | 54.4 | 58.4 | 27.9 | 31.6 |

The results in Tab. 3 show that the absolute bleaching action of the oxime esters I to be used according to the invention is very good. The compounds I are very good bleach activators, especially in the case of tea stains, and are in some cases distinctly superior to TAED especially at low temperatures. The preferred oxime esters of carbonic acid (Example 4) are also distinctly more effective than TAED for grass stains.

Examples of Use for Dishwashing Compositions

Bis(acetone oxime) isophthalate (Example 1) was tested for removal of tea stains as bleach activator component in the following household dishwashing composition:

35% by weight of sodium citrate dihydrate

27% by weight of sodium carbonate

27% by weight of sodium bicarbonate

7% by weight of sodium perborate monohydrate

2% by weight of bleach activator

2% by weight of $C_{13}$–$C_{15}$-fatty alcohol reacted with 4 mol of propylene oxide and 2 mol of ethylene oxide The bleach activator used according to the invention was bis(acetone oxime) isophthalate and for comparison was TAED.

white china cups were used to carry the tea stains (black Darjeeling) which were applied by conventional methods.

4 g of each of the above dishwashing composition formulations were used per liter of drinking water (10° German hardness) in a household dishwasher (Miele G 590 SC) for the test.

The result of cleaning was assessed visually after one cleaning cycle, with the score "0" meaning that a deposit is no longer visible, and score "5" meaning that the tea deposit is still entirely present.

A blank test without bleach activator in the above formulation resulted in a score of 5, the comparative test with TAED resulted in a score of 3, and the bleach activator according to the invention resulted in a score of 0.

We claim:

1. A process for activating inorganic peroxy compounds, comprising contacting an inorganic peroxy compound with an oximne ester of the general formula I

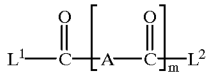

wherein $L^1$ is an oxime moiety of the formula

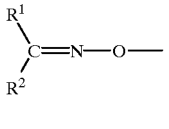

or

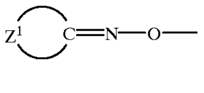

wherein $R^1$ and $R^2$ are each, independently, hydrogen, $C_{1-C30}$-alkyl, $C_2$–$C_{30}$-alkenyl, $C_5$–$C_{18}$-cycloalkyl, $C_7$–$C_{18}$-aralkyl or $C_6$–$C_{18}$-aryl or -hetaryl, where aliphatic radicals can adaitionally be functionalized by one to five hydroxyl groups, $C_1$–$C_4$-alkoxy groups, amino groups, $C_1$–$C_4$-alkylamino groups, di-$C_{1-C4}$-alkylamino groups, chlorine atoms, bromine atoms, nitro groups, cyano groups, carboxyl groups, sulfo groups, carboxy-$C_1$-$C_4$-alkyl groups, carbamoyl groups or phenyl, tolyl or benzyl radicals, where aromatic, cycloaliphatic and heteroaromatic structural units can likewise be substituted by said radicals, or be interrupted by one to eight non-adjacent oxygen atoms, amino groups, $C_1$–$C_4$-allylamino groups or carbonyl groups, and $Z^1$ is a 1,3-, 1,4-, 1,5-, 1,6-, 1,7- or 1,8-alkylene group with 3 to 30 carbon atoms, which can additionally be functionalized by one to five hydroxyl groups, ($C_1$–$C_4$-alkylamino groups, di-$C_1$–$C_4$-alkylamino groups, chlorine atoms, bromine atoms, nitro groups, cyano groups, carboxyl groups, sulfo groups, carboxy-$C_1$–C alkyl groups, carbamoyl groups or phenyl, tolyl or benzyl radicals, where aromatic nulcei can in turn likewise be substituted by said radicals, or be interrupted by one or two non-adjacent oxygen atoms, amino groups, $C_1$–$C_4$-alkylamino groups or carbonyl groups, $L^2$ is a second oxime moiety $L^1$ or (a) an acyloxy radical of the formula

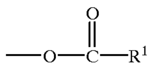

(b) a carboxamido radical of the fonnula

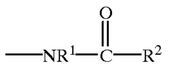

(f) an imidazolyl radical of the fonnula

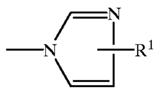

(g) a hydantoin residue of the formula

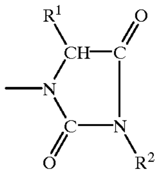

(h) a cyclic carbamate residue of the formula

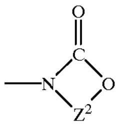

(j) a hydroxylactone residue of the formula

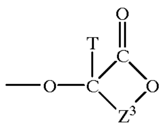

or (k) a lactam residue of the formula

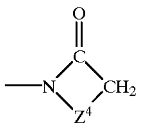

wherein $R^1$ and $R^2$ are each as defined above,

T is hydrogen or $C_1$–$C_4$-alkyl, and $Z^2$ to $Z^4$ are 1,2-, 1,3-, 1,4- or 1,5-alkylene groups with 2 to 20 carbon atoms, which can additionally be functionalized by one to three hydroxyl groups, $C_1$–$C_4$-alkoxy groups, amino groups, $C_1$–$C_4$-alkylamino groups, di-$C_1$–$C_4$-alkylamino groups, chlorine atoms, bromine atoms, nitro groups, cyano groups, carboxyl groups, sulfo groups, carboxy-$C_1$–$C_4$-alkyl groups, carbamoyl groups or phenyl, tolyl or benzyl radicals, where aromatic nulcei can in turn likewise be substituted by said radicals, or be interrupted by one or two non-adjacent oxygen atoms, amino groups, $C_1$–$C_4$-alkylamino groups or carbonyl groups, A is a chemical bond or a $C_1$–$C_{18}$-alkylene group, a $C_2$–$C_{18}$-alkenylene group, a $C_5$–$C_{32}$-cycloalkylene group, a $C_7$–$C_{30}$-aralkylene group or a $C_6$–$C_{18}$-arylene group or -hetarylene group, where aliphatic structural units can additionally be functionalized by one to five hydroxyl groups, $C_1$–$C_4$-alkoxy groups, amino groups, $C_1$–$C_4$-alkylamino groups, di-$C_1$–$C_4$-alkylamino groups, chlorine atoms, bromine atoms, nitro groups, cyano groups, carboxyl groups, sulfo groups, carboxy-$C_1$–$C_4$-alkyl groups, carbamoyl groups or phenyl, tolyl or benzyl radicals, where aromatic, cycloaliphatic and heteroaromatic structural units can likewise be substituted by said radicals, or be interrupted by one to eight non-adjacent oxygen atoms, amino groups, $C_1$–$C_4$-alkylamino groups or carbonyl groups, and m is 0 or 1.

2. A process as claimed in claim 1, where $L_1$ is an oxime moiety of the formula

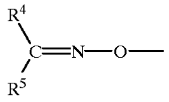

or

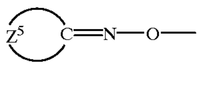

wherein $R^4$ and $R^5$ are each, independently, hydrogen, $C_1$–$C_4$-alkyl, phenyl or benzyl, and $Z^5$ is 1,4-butylene, 1,5-pentylene or 1,6-hexylene.

3. A process as claimed in claim 1, where $L^2$ is a second oxime moiety $L^1$.

4. A process as claimed in claim 1, wherein the oxime ester is used as cold bleach activators or an optical brighteners in a detergent, cleaner, bleach or disinfectant.

5. A detergent or bleach for textile laundering, containing from 0.1 to 20% by weight, based on the total amount of the formulation, of one or more oxime esters I as set forth claim 1.

6. A bleach additive for textile laundering, containing from 1 to 30% by weight, based on the total amount of the formulation, of one or more oxime esters I as set forth in claim 1.

* * * * *